(12) United States Patent
Grigsby, Jr. et al.

(10) Patent No.: US 7,049,265 B2
(45) Date of Patent: May 23, 2006

(54) ORGANIC ANION CATALYST SYSTEM FOR FOAMS

(75) Inventors: Robert A. Grigsby, Jr., Austin, TX (US); Robert L. Zimmerman, Austin, TX (US); Ernest L. Rister, Jr., Round Rock, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 10/630,121

(22) Filed: Jul. 30, 2003

(65) Prior Publication Data

US 2005/0026775 A1   Feb. 3, 2005

(51) Int. Cl.
*B01J 31/00* (2006.01)
(52) U.S. Cl. .................. 502/152; 502/156; 502/157; 502/162; 502/164; 502/167; 502/170; 502/171; 502/172; 502/200
(58) Field of Classification Search ............ 502/152, 502/156, 157, 164, 167, 162, 170, 171, 172, 502/200
See application file for complete search history.

(56) References Cited

U.S. PATENT DOCUMENTS

| | | | | |
|---|---|---|---|---|
| 4,606,837 A | * | 8/1986 | McEntire et al. | 252/73 |
| 4,952,732 A | * | 8/1990 | Speranza et al. | 564/390 |
| 5,162,385 A | | 11/1992 | Hartwig et al. | 521/118 |
| 5,286,758 A | | 2/1994 | Christman et al. | 521/125 |
| 5,563,180 A | | 10/1996 | Skowronski et al. | 521/125 |

FOREIGN PATENT DOCUMENTS

EP   0 656 382 A1   6/1995

* cited by examiner

*Primary Examiner*—John M. Cooney, Jr.
(74) *Attorney, Agent, or Firm*—Edward Korompai

(57) ABSTRACT

Disclosed herein are compositions useful for introducing metal carboxylate salts as catalysts into systems useful for producing polyurethane and polyisocyanurate foams. The methods permit the introduction of such catalysts in the absence of substantial amounts of water which otherwise cause inferior foams to be produced. A method for producing foam employing the catalysts are also described.

20 Claims, No Drawings

ORGANIC ANION CATALYST SYSTEM FOR FOAMS

TECHNICAL FIELD

The present invention relates generally to methods and compositions useful for delivering catalysts useful in the preparation of polymeric foams to mixtures from which foams may be prepared. The invention relates more particularly to a method and compositions useful for delivery of normally water-soluble catalysts to mixtures from which foams may be produced, wherein the amount of water required to accompany the catalyst using prior art methods would react with the mixture from which the foam is produced in a fashion which negatively impacted the physical properties of the foam product made from the mixture. Through use of this invention, foam products having improved physical properties over the prior art may be produced.

BACKGROUND OF THE INVENTION

A wide range of mixtures are known in the art from which various types of foam products may be produced. Foams may be produced by providing a thermoplastic material above its melting point with a blowing agent to form a mixture, and subjecting the mixture to a reduction in pressure and simultaneous cooling. Typical thermoplastic materials may be selected from polyolefins, for example, polyethylene. To molten polyethylene may be added a blowing agent known in the art such as pentane, to form a mixture, the whole being done under a pressure greater than atmospheric. When such a mixture is passed from a pressure greater than atmospheric to atmospheric pressure through, for example, an extruder die, the pentane is caused to vaporize while the molten polyethylene simultaneously cools to its solidification point. If the expansion is carried out under sufficient control and conditions known to those skilled in the polymeric foam art, a foam product having cells of pentane contained within a matrix of polyethylene, i.e., polyethylene foam, may be formed.

Other foams may be similarly produced, with but one example being polyurethane foam. Polyurethanes are produced by the reaction of an organic polyol with an organic isocyanate, preferably in the presence of one or more catalysts which promote the reaction between the polyol and isocyanate and reactions between isocyanates and urethanes to produce crosslinked or thermoset foams, as such are generally known to those skilled in the polymer foam art. Production of polyurethane foam is generally carried out by the cocomminutation of the polyol, isocyanate, and blowing agent followed by its immediate and controlled expansion, for once cured, thermoset polyurethane cannot be reprocessed as thermoplastic polyolefin-derived foams can. Typical isocyanates used for polyurethane and polyisocyanurate foam production include without limitation: 4,4'-diphenylmethane diisocyanate, 2,4'-diphenylmethane diisocyanate, 2,2'-diphenylmethane diisocyanate, toluene diisocyanate, or a functionally-equivalent (with respect to reactivity towards polyols) polymerized form of any of the foregoing as such polymerized forms are known to those skilled in the art. Typical polyols used for polyurethane and polyisocyanurate foam production include without limitation polyester polyols and polyether polyols, as such are known to those skilled in the art.

Various catalysts have been developed and discovered which are useful for promoting the reaction between the polyol and isocyanate portions from which polyurethanes are derived. Typically, metal cations displaying monovalency are useful in this regard, such as the alkali metals including sodium, potassium, rubidium, and cesium, with potassium being especially preferred. However, since most potassium salts are very soluble in water but are not normally soluble in organic matrices owing to the general lack of polarity and hydrophillicity of organic matrices in general, and particularly the organic components from which polyurethanes are formed (polyol and isocyanate), those desiring to employ cations such as potassium and particular anions have generally been limited in the prior art with respect to the anions which accompany the potassium, with polycyclic aromatic anions such as naphthenates and higher carboxylic anions such as octoate and higher being preferred.

The desirability of providing new catalysts useful in producing polyurethane foams is exemplified by the following documents, which are incorporated herein in their entirety by reference thereto: U.S. Pat. No. 5,286,758 teaches the use of potassium formate dissolved in water. In this prior art, the water that is used to dissolve the potassium formate is the blowing agent. The foams produced according to this prior art are generally very friable. U.S. Pat. No. 5,162,385 teaches the use of potassium acetate in a solution of ethylene glycol. In this prior art method, the blowing agent is a carboxylic acid. European Patent Application 656382 teaches the use of a hydroxyalkyl quaternary ammonium trimerization catalyst, a carboxylic acid and a second trimerization catalyst.

It would be desirable to be able to use formic acid because the specific reaction rate for formation of isocyanurate varies inversely with the molecular weight of the organic acid. Also, it is known in the art that anions of lower carboxylic acids are more ionic in character than higher carboxylic acids, and it is readily observable that as the ionic character of the anion increases, the time to final cure of the polyurethane or polyisocyanurate formed in its presence is seen to be delayed in direct proportion to the ionic character of the ionic character of the anion. However, the only method of delivery heretofore has been a system which includes substantial amounts of water to render the alkali metal carboxylate soluble and provide it in a homogeneous state to a component or the components from which the polyurethane is derived. Unfortunately, as is well-known to those in the polymeric foam art, water reacts rapidly with isocyanates, especially in the presence of catalysts to form cyclic carbamic acids which decompose to primary amines with the evolution of carbon dioxide. The primary amine thus formed rapidly and deleteriously consumes substantial amounts of the isocyanate present with the resultant formation of highly crystalline urea(s). Small amounts of water are also capable of reacting with isocyanate, resulting in the rapid consumption of the isocyanate due to the low equivalent weight of water. Polyurethane foams produced in the presence of appreciable amounts of water are accordingly much more friable than foams produced in the absence of water, and the insulation value of foams produced without water are much improved over foams containing or formed in the presence of appreciable amounts of water. Therefore, it is desired that water be limited in the mixture when polyurethane foams are produced.

Accordingly, if a water-free composition and means were found which would provide for the introduction of essentially anhydrous catalysts which heretofore could only be introduced by having appreciable quantities of water present along with the catalysts, such would be a significant advance in the art which would open the doors to the use of a myriad of potential catalyst materials, thus providing the chemist with the ability to create new foams having previously unobserved properties. The present invention provides such compositions and means.

SUMMARY OF THE INVENTION

The present invention provides compositions of matter useful as a catalyst delivery vehicle, which compositions, in one embodiment, comprise: 1) an oxyalkylene compound (including without limitation alkylene glycols and polyalkylene glycols); 2) an amino compound, which may be a primary, secondary, or tertiary amine but is preferably a Mannich condensate; and 3) a reaction product of an acidic substance with a basic substance, which is preferably a metallic salt of formic acid.

According to one form of the invention, when an alkylene glycol is employed as the oxyalkylene compound, it is embraced by the formula:

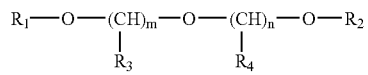

in which $R_1$, $R_2$, $R_3$, and $R_4$ are independent of each other and are each independently selected from the group consisting of H, methyl, ethyl, propyl, and butyl; and m and n are each independently any whole integer between 1 and 4, inclusive. The amino compound or Mannich condensate may be either added to the alkylene (or polyalkylene) glycol, or may be formed in solution using the alkylene or polyalkylene glycol as a solvent, to produce a solution of amino compound (or Mannich condensate) in a glycol. The final composition is provided by introducing the selected carboxylic acid into the solution of the Mannich condensate in the alkylene (or polyalkylene) glycol, to form a ternary homogeneous solution (glycol+amino compound (or Mannich condensate)+formic acid), and then adding an aqueous solution or suspension of metal hydroxide slowly (preferably by the drop) to the ternary homogeneous solution. Addition of the aqueous hydroxide results in a neutralization reaction between the formic acid and base(s) to form the salt of the formic acid in a non-insoluble form, so as to provide a homogeneous solution.

It has been unexpectedly discovered that metal formates prepared in this fashion do not precipitate from the solution but rather form a stable, homogeneous, single-phase solution. It has been further discovered that these solutions function especially well in delivering catalysts, such as potassium formate or potassium acetate, to systems from which polyurethane and polyisocyanurate foams may be produced, in the absence of detrimental amounts of water, for the first time ever.

DETAILED DESCRIPTION

Compounds, including without limitation alkylene glycols, which are embraced by:

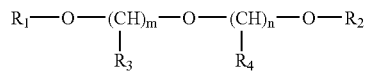

in which $R_1$, $R_2$, $R_3$, and $R_4$ are each independently selected from the group consisting of H, methyl, ethyl, propyl, and butyl; and m and n are each independently a whole integer between 1 and 4 inclusive, are especially preferred for use as components in the solutions of this invention since they are suitable solvents in which to carry out a Mannich condensation reaction from which the Mannich condensates according hereto may be prepared in situ when it is desired to use a Mannich base as the amino compound.

The Mannich condensation reaction is well known to those skilled in the chemical arts, and generally involves a condensation reaction in which one mole each of a phenol, an aldehyde, and an amino compound having at least one active hydrogen attached to a nitrogen atom are heated to an elevated temperature and caused to react with the elimination of one mole of water for each mole of reactant present. Suitable amines useful for producing Mannich condensates for use in this invention include all primary and all secondary amines. Amino acids are also suitable amines useful for producing Mannich condensates for use in this invention. When amino acids are selected, they may be chosen from lysine, aspartic acid, sarcosine, cysteine, proline, phenylalanine, glycine, and serine.

Accordingly, the choice of alkylene or polyalkylene glycol used will depend upon the specific reaction profile for each Mannich condensation product which is desired to be employed according to this invention, and may be readily determinable by those skilled in the art for the particular Mannich condensate desired. In cases where reaction activation energies are higher for the Mannich condensation reaction, a higher boiling glycol may be used to hasten the reaction. Of course the boiling point of the glycol may be advantageously and effectively used as a means for controlling the temperature of the reaction mixture, as the use of the boiling point of liquids for controlling the temperature of a refluxing mixture is well known to those skilled in the chemical arts. Suitable glycols useful in the present invention include ethylene glycol, diethylene glycol, propylene glycol, ethylene glycol monomethyl ether, dipropylene glycol, and triethylene glycol.

The alkylated phenol from which the Mannich condensate is derived may contain a phenol nucleus having one, two, or three alkyl groups bonded to the benzene ring of the phenol. When one alkyl group is bonded to the benzene ring of a phenol, the resulting alkylated phenol is known in the art as a mono-alkylate. When two alkyl groups are bonded to the benzene ring of a phenol, the resulting alkylated phenol is known in the art as a di-alkylate. However, it is most preferred that there is one alkyl group, straight-chain or branched, substituted or unsubstituted, bonded to the benzene ring. When a phenol having a single alkyl group bonded to the benzene ring is employed as a reactant from which a Mannich condensate is employed according to this invention, it is most preferred that the one alkyl group includes between 2 and 20 carbon atoms per alkyl group. As examples of such groups, but by no means delimitive thereof, the following alkyl groups are offered as exemplary: methyl, ethyl, propyl, butyl, pentyl, hexyl, heptyl, octyl, nonyl, decyl, undecyl, dodecyl, tridecyl, tetradecyl, and structural isomers of any of the foregoing, and including those which may be substituted with various pendant groups in various positions of the alkyl chain using means known to those skilled in this art, including hydoxy, halogen, amino, etc.

Currently, the most preferred amino compound for use in the invention is a Mannich condensate, which is that formed from the reaction between nonylphenol, formaldehyde, and sarcosine. When this Mannich condensate is employed, the most preferred glycol is diethylene glycol ("DEG"). A composition containing this Mannich condensate in diethylene glycol is available from Huntsman Petrochemical Corporation of The Woodlands, Texas under the trade name of JEFFCAT® TR-52. This material contains 55% by weight of DEG with the balance being the Mannich condensate. However, other amino compounds are anticipated as frmnctioning in similar regard as the Mannich condensate including all primary, secondary, or tertiary amines known to those skilled in the art set forth in the Merck Index, 12$^{th}$ edition, Published by Merck & Co., Inc. of Whitehouse Station, N.J., the entire contents of which is herein incorporated by reference thereto, and include without limitation methylamine, ethylamine, propylamine, butylamine, pentylamine hexylamine, hepytlamine, octylamine, nonylamine, decamine, undecamine, dodecamine, or isomers of any of the foregoing. Polyalkylene polyamines such as, exemplary but not delimitive include ethylene diamine, diethylene triamine, triethylene tetramine, propylene triamine, dipropylene tetramine, tripropylene pentamine are also useful. Substituted amines having one, two, or three of the following functional groups are useful in such regard: methyl, ethyl, propyl, butyl, pentyl, hexyl, octyl, nonyl, and decyl, including any structural isomers of any of the foregoing.

According to the method herein set forth, homogeneous solutions of metallic carboxylates in alkylene or polyalkylene glycols which also contain a Mannich condensate or other amine may be produced using acids other than formic. Accordingly, carboxylic acids, either monocarboxylic and di-carboxylic, whether aliphatic or aromatic, straight-chain or branched, saturated or unsaturated, and having between 1 and 20 carbon atoms per molecule, inclusive, are herein indicated as being useful herein for forming such solutions, including: acetic, propanoic, and butyric; and the di-acids succinic, malonic, phthalic, maleic, etc. Hydroxy acids such as glycolic and other polyhydric acids known to those skilled in the chemical arts are also herein indicated as being useful therefor. The only proviso for producing solutions of salts useful as catalysts in producing foam products according to this invention is that the organic acid contain at least one carboxylic acid group per molecule.

To demonstrate the efficacy of the instant compositions, catalyst mixtures were prepared by adding the ingredients set forth in table I in a small vial with mechanical mixing for 30 minutes at room temperature.

TABLE I comparative compositions according to the invention in which composition CAT 1 contains potassium formate, and in which composition CAT 2 contains only potassium hydroxide.

| Material | CAT 1 amount in grams | CAT 2 amount in grams |
|---|---|---|
| JEFFCAT ® TR-52 | 10.0 | 10.0 |
| Formic acid | 0.68 | 0 |
| KOH (aqueous) | 1.75 | 1.75 |

Of the reactants used in Table I, the potassium hydroxide solution in each case was a 40% by weight aqueous solution. In sample CAT 1, the formic acid was added directly to the JEFFCAT® TR-52, and the solution mixed until homogeneous which took about one minute. Next, the potassium hydroxide was added to this solution drop by drop using moderate stirring, and mixture effected. No signs of precipitation or the presence of solids were noted in the final mixture. In the case of sample CAT 2, the stated amount of potassium hydroxide was added directly to the JEFFCAT® TR-52.

A large quantity of a "B" component of a rigid foam formulation was prepared by the co-comminitation of 672.5 grams of the polyester polyol Terate® 2541 available from Kosa Inc. of 4600 Highway 421 North, Wilmington, N.C. 28402, and 14.8 grams of the surfactant Tergostab® B-8404 available from TH Goldschmidt of Hopewell, Va., and 4.70 grams of water and 215.2 grams of Isotron® 141B, available from LaRoche Industries, Inc. of 1200 Airline Highway, Baton Rouge, La. 70805. The ingredients were thoroughly co-mingled until a uniform mixture had resulted.

Samples of rigid foam were prepared using the B component described above, and the isocyanate known as Rubinate® M available from Imperial Chemical Industries Ltd of 286 Mantua Grove Rd., West Deptford, N.J., according to the following procedure. Into a 1 quart paper cup, was weighed. 54.4 grams of the above B component. An amount of catalyst as prescribed in Table II was then weighed into the cup, and the contents of the cup mixed for 5 seconds using a high-shear mixer at 3000 rpm. The Rubinate® M, was then added to the mixture and the components subsequently mixed for an additional five seconds using the same mixer and rpm as described above. Each cup was set on a flat surface to rest and the rise profile, cream time, gel time, tack free time and rise times recorded. The results are tabulated in Table II below. All quantities are in grams.

TABLE II compositions from which rigid foams were produced and rise profiles associated therewith.

| Composition | A | B | C | D |
|---|---|---|---|---|
| B-Component | 54.4 | 54.4 | 54.4 | 54.4 |
| Rubinate ® M | 72.8 | 72.8 | 72.8 | 72.8 |
| CAT 1 | 3.72 | 2.48 | 0 | 0 |
| CAT 2 | 0 | 0 | 4.0 | 0 |
| JEFFCAT ® TR-52 | 0 | 0 | 0 | 3.0 |
| 40% KOH (aqueous) | 0.52 | 0.35 | 0.56 | 0 |
| cream time/sec. | 21 | 24 | 26 | 36 |
| gel time/sec. | 48 | 48 | 67 | 90 |
| tack free time/sec. | 60 | 77 | 104 | 164 |
| rise time/sec. | 94 | 95 | 122 | 180 |

In Table II, examples A and B have the potassium salt of formic acid dissolved in JEFFCAT® TR-52. Example C has only potassium hydroxide dissolved in JEFFCAT® TR-52. Example D uses only JEFFCAT® TR-52. Example A has the same amount of JEFFCAT® TR-52 in the blend as is used in Example D.

As is evident from the data in Table II, the addition of potassium hydroxide to JEFFCAT® TR-52 changes the rise profile considerably. Using the potassium salt of formic acid further changes the rise profile as compared to the potassium hydroxide alone. In fact, there is less added potassium hydroxide in example A than in example C as is evident from the table, yet the critical times are all achieved in much shorter order in Example A, thus demonstrating the synergistic effect of having the formate anion present along with the potassium atom in the catalyst system, a result heretofore unachievable in the absence of appreciable and detrimental quantities of water.

Although potassium is the most preferred cation when present with a formate anion, glycol, and amino compound for catalyzing the polyurethane reaction according to the invention, other species that are normally insoluble in organic systems may be produced in a soluble form according to the this invention, using a different acid in place of the formic acid and an alkaline substance other than potassium hydroxide. Since the reaction product between potassium hydroxide and formic acid is well-perceived to result in the formation of the metallic salt known as potassium formate, and since potassium formate is normally insoluble in organic matrices such as those from which polyurethanes are produced, it seems unlikely that what is produced by admixture of these acidic and alkaline substances produce what is normally encountered. It is probably most accurate to describe the resulting product from the reaction of the organic acid with the hydroxide as a "reaction product", rather than as simply as a metallic salt. This is because the present inventors do not be wish to be bound by any particular theory as to why the instant invention works as well as it does, because the mechanistics are little understood at this time. Therefore, for purposes of this specification and the appended claims the words "reaction product" means the resulting chemical product produced from the reaction between an organic acid (or anhydride) and an alkaline substance when carried out as set forth herein. The reaction is essentially an acid-base neutralization reaction.

It is further understood that the reaction product may comprise the reaction product from any acidic organic species, (including organic acids and their anhydrides known at the time of this writing by those skilled in the art and listed in the Merck Index, $12^{th}$ edition, Published by Merck & Co., Inc. of Whitehouse Station, N.J., the entire contents of which is herein incorporated by reference thereto, as such organic acids and their anhydrides are well known to those skilled in the various chemical arts), and any alkaline species, provided the two are mixed according to the this invention.

Suitable alkaline components of the reaction product component of this invention may be selected from substances such as, without limitation, the Alkali, Alkaline Earth, or Transition, or other metals themselves; hydroxides, alkoxides, amides, or salts of any of the foregoing with organic acids having at least one alpha hydrogen adjacent to the carboxylic group, etc.

Metal hydroxides, alkoxides, and amides have all been well known in the chemical arts for quite some time, and may be prepared according to conventional methods known in the art for producing them. All metal cations and most, if not all, ammonium ions are capable of functioning as a positive charge carrying species sufficient to confer electrical neutrality to a compound which contains an equal amount of anionic charge owing to the presence of one or more hydroxy, alkoxy, or amido moieties.

In cases where alkoxides or amides are to be used, the number of carbon atoms and exact structure of alcohol or amine from which the alkoxide or amide is derived is not critical, as the function of such species are merely to provide a cationic species on the one hand and an anion which tends to react with and thus effectively remove water from the system. Accordingly, any alkaline substance capable of providing a metallic (or ammonium or substituted ammonium) species and which substance is capable of reacting with an acidic organic species in a neutralization reaction is useful in producing a reaction product according to this invention. Preferably such species includes very little water, and most preferably no water.

In addition, amines and alkyl substituted amines are also useful as the alkaline component from which the reaction product may be formed. Suitable amines include all primary, secondary, or tertiary amines known to those skilled in the art set forth in the Merck Index, and include without limitation methylamine, ethylamine, propylamine, butylamine, pentylamine hexylamine, hepytlamine, octylamine, nonylamine, decamine, undecamine, dodecamine, or isomers of any of the foregoing. Polyalkylene polyamines such as, exemplary but not delimitive include ethylene diamine, diethylene triamine, triethylene tetramine, propylene triamine, dipropylene tetramine, tripropylene pentamine are also useful. Substituted amines having one, two, or three of the following functional groups are useful in such regard: methyl, ethyl, propyl, butyl, pentyl, hexyl, octyl, nonyl, and decyl, including any structural isomers of any of the foregoing.

The order of mixing of the reactants from which the reaction product component of this invention is not critical to the final catalyst composition. However, it is most preferred that the acidic organic species is added to a first mixture of the amino compound and the glycol, in order to form a second mixture. It is preferable then to add the alkaline substance to the second mixture to arrive at the final product. It is also functionally equivalent to add the alkaline substance to a first mixture of the amino compound and the glycol in order to form a second mixture to which the acidic substance is subsequently added. It is most preferable, however, when combining an acidic component of the final composition with an alkaline component of the final composition that the acidic and alkaline components be in the same state of matter, i.e., the liquid state.

The temperature of mixing of the alkaline component and the acidic component from which the reaction product is formed is not critical to the performance of the final product according to the invention. Temperatures in the range of between about 5 degrees centigrade up to the lesser boiling point of either the glycol or amino compound employed may be used advantageously herein. Preferably, this temperature is in the range of about 5 degrees centigrade to 180 degrees centigrade, more preferably between 10 degrees centigrade and 90 degrees centigrade, and most preferably between 20 degrees centigrade and 60 degrees centigrade with 25 degrees centigrade being most preferred.

Although the present invention describes the use of Mannich condensates dissolved in a suitable alkylene or polyalkylene glycol solvent as a vehicle in which metallic carboxylates may be formed and readily delivered to systems from which foam products may be produced, the present invention also contemplates the replacement or augmentation of the Mannich condensate component with an organic compound which contains either a primary, a secondary, or a tertiary amine, whether or not other functional groups are present on the molecule containing the primary, a secondary, or a tertiary amine group. Such amino compounds may be mono, di, tri, or poly amino compounds which may be saturated or unsaturated, straight chain or branched, aromatic or aliphatic, and preferably contain between 2 and 20 carbon atoms per molecule.

Representative amines useful in this regard are: methylamine, ethylamine, propylamine, butylamine, pentylamine hexylamine, hepytlamine, octylamine, nonylamine, decamine, undecamine, dodecamine, or isomers of any of the foregoing. Polyalkylene polyamines such as, exemplary but not delimitive include ethylene diamine, diethylene triamine, triethylene tetramine, propylene triamine, dipropylene tetramine, tripropylene pentamine are useful.

As mentioned, the catalytic compositions of this invention are useful in forming foam products by promoting the reaction between a hydroxy group of an organic polyol and an isocyanate group of an organic isocyanate contained in a mixture of polyol and isocyanate to which the catalytic composition is caused to be in contact under foaming conditions in the presence of a blowing agent in order to form polyurethane foams, or amongst isocyanates themselves under foaming conditions in the presence of a blowing agent in order to form polyisocyanurate foams. Conditions useful for providing foams of either the polyurethane type or polyisocyanurate type are well known to those skilled in the art, as well as methods for producing foamed articles from foams belonging to either of these classes of materials. Therefore, the present invention also includes molded articles produced using the catalysts of this invention, regardless of the particular molding technique employed, with the proviso that the molding technique and the article are those known to artisans of ordinary skill.

Although the present invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims which now follow.

We claim:

1. A catalytic composition of matter useful in producing foam products which comprises:
   a) a compound of the formula:

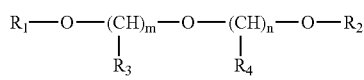

wherein $R_1$, $R_2$, $R_3$, and $R_4$ are each independently selected from the group consisting of H, methyl, ethyl, propyl, butyl, pentyl, and any isomers of the foregoing; and m and n are each independently whole integers between 1 and 4 inclusive;
   b) at least one Mannich condensate of an amino acid; and
   c) a reaction product formed from the reaction between formic acid and an alkaline substance;
   wherein said catalytic composition is homogeneous.

2. A composition according to claim 1 wherein said reaction product is present in an effective catalytic amount for promoting the reaction between a hydroxy group of an organic poiyoi and an isocyanate group of an organic isocyanate contained in a mixture of polyol and isocyanate to which said catalytic composition is caused to be contacted.

3. A composition according to claim 1 wherein said alkaline substance includes a hydroxide of a chemical species selected from the group consisting of: alkali metals, alkaline earth metals, transition metals, metals of Group IV of the Periodic Table of Elements, and substituted or unsubstituted ammonium ions.

4. A composition according to claim 1 wherein said alkaline substance includes an alkoxide of a chemical species selected from the group consisting of: alkali metals, alkaline earth metals, transition metals, metals of Group IV of the Periodic Table of Elements and alkyl-substituted or unsubstituted ammonium ions.

5. A composition according to claim 1 wherein said alkaline substance includes a cation selected from the group consisting of: monovalent metal cations, and di-valent metal cations, tetravalent metal cations, and alkyl-substituted or unsubstituted ammonium ions.

6. A composition according to claim 5 wherein said monovalent metal cation is selected from the group consisting of: sodium, potassium, rubidium, and cesium.

7. A catalytic composition of matter useful in producing foam products which comprises:
   a) a compound selected from the group consisting of: ethylene glycol, diethylene glycol, propylene glycol, ethylene glycol monomethyl ether, dipropylene glycol, and triethylene glycol;
   b) at least one Mannich condensate of an amino acid; and
   c) a reaction product formed from the reaction between formic acid and an alkaline substance;
   wherein said catalytic composition is homogeneous.

8. A composition according to claim 1 wherein said Mannich condensate is formed from the condensation of an alkyl phenol, formaldehyde, and an amino acid having at least one active hydrogen atom attached to a nitrogen atom.

9. The composition according to claim 7 wherein said amino acid is selected from the group consisting of: lysine, aspartic acid, cysteine, proline, phenylalanine, glycine, and serme.

10. The composition according to claim 8 wherein said alkyl phenol includes at least one alkyl group having between 2 and 20 carbon atoms bonded to the benzene ring.

11. The composition according to claim 8 wherein the alkyl phenol is a mono-alkylated or di-alkylated phenol which contains at least one alkyl group selected from the group consisting of methyl, ethyl, propyl, butyl, pentyl, hexyl, heptyl, octyl, nonyl, decyl, or any structural isomers of the foregoing bonded to the benzene ring of said phenol.

12. A composition according to claim 1 wherein said amino acid is selected from the group consisting of: lysine, aspartic acid, cysteine, proline, phenylalanine, glycine, and serine.

13. A composition according to claim 1 wherein said amino acid is sarcosine.

14. A composition according to claim 7 wherein said amino acid is sarcosine.

15. A composition according to claim 7 wherein said reaction product is present in an effective catalytic amount for promoting the reaction between a hydroxy group of an organic poyol and an isocyanate group of an organic isocyanate contained in a mixture of polyol and isocyanate to which said catalytic composition is caused to be contacted.

16. A composition according to claim 7 wherein said alkaline substance includes a hydroxide of a chemical species selected from the group consisting of: alkali metals, alkaline earth metals, transition metals, metals of Group IV of the Periodic Table of Elements, and substituted or unsubstituted ammonium ions.

17. A composition according to claim 7 wherein said alkaline substance includes an alkoxide of a chemical species selected from the group consisting of: alkali metals, alkaline earth metals, transition metals, metals of Group IV of the Periodic Table of Elements and alkyl-substituted or unsubstituted ammonium ions.

18. A composition according to claim 7 wherein said alkaline substance includes a cation selected from the group consisting of: monovalent metal cations, and di-valent metal cations, tetravalent metal cations, and alkyl-substituted or unsubstituted ammonium ions.

19. A composition according to claim 18 wherein said monovalent metal cation is selected from the group consisting of: sodium, potassium, rubidium, and cesium.

20. A catalytic composition of matter useful in producing foam products which comprises:

a) a compound selected from the group consisting of: ethylene glycol, diethylene glycol, propylene glycol, ethylene glycol monomethyl ether, dipropylene glycol, and triethylene glycol;

b) at least Mannich condensate of sarcosine; and c) a reaction product formed from the reaction between formic acid and an alkaline substance;

wherein said catalytic composition is homogeneous.

* * * * *